United States Patent [19]

Toelle

[11] Patent Number: 4,924,370
[45] Date of Patent: May 8, 1990

[54] LOW-LOSS AND LOW-REACTIVE POWER SWITCHING RELIEF DEVICE FOR THE SEMICONDUCTOR SWITCHES OF AN INVERTER

[75] Inventor: Hans-Juergen Toelle, Erlangen, Fed. Rep. of Germany

[73] Assignee: Siemens Aktiengesellschaft, Berlin & Munich, Fed. Rep. of Germany

[21] Appl. No.: 326,608

[22] Filed: Mar. 21, 1989

[30] Foreign Application Priority Data

Mar. 28, 1988 [DE] Fed. Rep. of Germany ....... 3810535

[51] Int. Cl.$^5$ .................... H02H 7/122; H02M 7/515
[52] U.S. Cl. ....................................... 363/57; 363/96; 363/138
[58] Field of Search ..................... 363/55–58, 363/96, 135–138

[56] References Cited

U.S. PATENT DOCUMENTS

| | | | |
|---|---|---|---|
| 4,611,267 | 9/1986 | McMurray | 363/58 |
| 4,691,270 | 9/1987 | Pruitt | 363/56 |

FOREIGN PATENT DOCUMENTS

| | | | |
|---|---|---|---|
| 0149140 | 6/1981 | Fed. Rep. of Germany | 363/58 |
| 3244623 | 12/1982 | Fed. Rep. of Germany | |
| 3524522 | 7/1985 | Fed. Rep. of Germany | |

OTHER PUBLICATIONS

Klemens Heumann and Rainer Marquardt, "GTO-Thyristoren in Selbstgefuhrten Stromrichtern", Electrotechnische Zeitschrift, vol. 104 (1983) No. 718, pp. 328–322.

*Primary Examiner*—Peter S. Wong
*Attorney, Agent, or Firm*—Kenyon & Kenyon

[57] ABSTRACT

A low-loss and low-reactive power switching relief circuit has an inverter output section coupled at its upper and lower ends to the positive or negative potential of a DC voltage source, respectively. The coupling is via saturable stepping choke coils. A wiring network serves as a switching relief for the semiconductor switches of each inverter phase. A circuit having a switching-off relief capacitor, two storage capacitors and two switching-off relief diodes causes uniform switching-off relief. A circuit having two current rate of rise limiting choke coils and four feedback diodes causes uniform switching-on relief of the upper and lower semiconductor switches, respectively. By means of the stepping choke coils, the output section and the wiring network are temporarily decoupled from the DC voltage source during the switching-on process of one of the semiconductor switches. This occurs in such a manner that the interim-stored trapped energy is fed into the load nearly without loss and any reactive power.

9 Claims, 6 Drawing Sheets

LOW-LOSS AND LOW-REACTIVE POWER SWITCHING RELIEF DEVICE FOR THE SEMICONDUCTOR SWITCHES OF AN INVERTER

FIELD OF THE INVENTION

The invention relates to an electrical relief device and, more particularly, to a device for low-loss relief during the switching-on and off process of semiconductor switches in a single or multi-phase inverter circuit having a DC source voltage.

BACKGROUND OF THE INVENTION

Relief circuits for semiconductor switches are known, for example, from German patent DE-OS No. 32 44 623 and are described in "Elektrotechnische Zeitschrift (etz)", Vol. 104, No. 7/8, pages 328 to 322", noting page 131, 1983. This known wiring network is shown in FIG. 1 and contains two switching-on relief choke coils L1, L2, a switching-off relief capacitor $C_A$, a storage capacitor $C_{SP}$, two switching-off relief diodes D10, D20 and a discharging resistor R.

Figure 1:
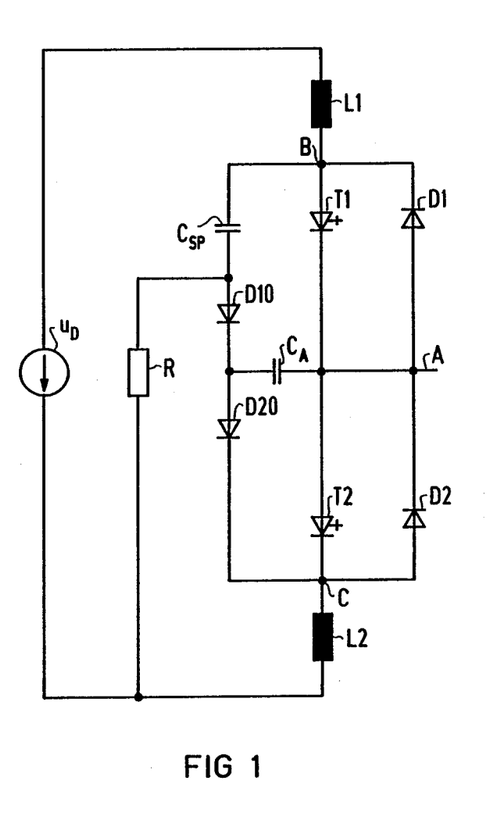
FIG. 1 is a schematic diagram of a prior art wiring network for an inverter.

The phase inverter shown in FIG. 1 contains semiconductor switches T1 and T2 wired antiparallel with bypass diodes D1 and D2, respectively. An upper and lower end B and C of the phase inverter is coupled to the positive and negative potential, respectively, of the feeding DC voltage source $u_D$ via first and second switching-on relief choke coils L1 and L2, respectively The relief choke coils L1, L2 act as current rise limiters.

The switching-off relief capacitor $C_A$ is coupled at one end to the load output A of the phase inverter Further, the series circuit including storage capacitor $C_{SP}$ and the first switching-off relief diode D10 is coupled between the upper end B of the phase inverter and the other end of the switching-off relief capacitor $C_A$. The second switching-off relief diode D20 is coupled to the junction point of the series circuit and the other end of the switching-off relief capacitor $C_A$ and to the lower end C of the phase inverter. A discharge resistor R serves to break up the trapped wire energy stored in the switching-off relief choke coils and the storage capacitor during the switching-off process. The discharge resistor R couples the junction point between the storage capacitor $C_{SP}$ and the first switching-off relief diode D10 to the negative potential of the DC voltage source $u_D$. In another embodiment (not shown), a feedback device called a "chopper circuit" is used instead of the discharge resistor R to feed the trapped wire energy back into the DC voltage source $u_D$.

The prior wiring network has the disadvantage of having circuit-related asymmetry. Thus, the series circuit of the storage capacitor $C_{SP}$ and the switching-off relief capacitor $C_A$ has a relieving effect. On the other hand, when the lower semiconductor switch T2 is switched off, only the switching-off relief capacitor $C_A$ has the relieving effect. Such asymmetry causes the generally identical semiconductor switches T1, T2 to be protected differently. Therefore, when designing such a circuit, the different rates of rise occurring for the periodic positive blocking voltage at the respective switches when the semiconductor switches T1 and T2 are switched off must be taken into consideration. The prior circuit has the further disadvantage that pulse-like currents occur in the leads of the feeding source due to the discharge resistor R.

Additionally, if an energy recovery device is used instead of the discharge resister R, the trapped energy stored in the network is fed back into the source $u_D$. This, however, corresponds to a "reactive commutation power" required by the inverter which must periodically be made available by the feeding DC voltage source $u_D$ for the purpose of switching off and on the switching relief network for the semiconductor inverter switches T1, T2. Furthermore, it is not possible and permissible for every application to subject the input DC voltage source $u_D$ to recharging energy pulsating in this manner.

Therefore, there is a need to provide a wiring network having a low-loss and symmetrical switching-off and on relief for the semiconductor switches of an inverter. Further, such a wiring network must operate without loading the feeding DC voltage source.

SUMMARY OF THE INVENTION

The present invention overcomes the problems in the prior wiring network by providing a low-loss and low-reactive power switching relief circuit. The output section of an inverter is coupled at its upper and lower ends to the positive or negative potential of a DC voltage source, respectively. The coupling is via saturable stepping choke coils. A wiring network serves as a switching relief for the semiconductor switches of each inverter phase. A circuit having a switching-off relief capacitor, two storage capacitors and two switching-off relief diodes causes uniform switching-off relief. A circuit having two current rate of rise limiting choke coils and four feedback diodes causes uniform switching-on relief of the upper and lower semiconductor switches, respectively. By means of the stepping choke coils, the output section and the wiring network are temporarily decoupled from the DC voltage source during the switching-on process of one of the semiconductor switches. This occurs in such a manner that the interim-stored wiring energies is fed into the load nearly without loss and any reactive power.

BRIEF DESCRIPTION OF THE DRAWINGS

FIGS. 4A–4D are schematic diagrams illustrating the operation of the current paths for the wiring network of the present invention when an inverter switch is switched on.

DETAILED DESCRIPTION OF THE INVENTION

Figure 2:
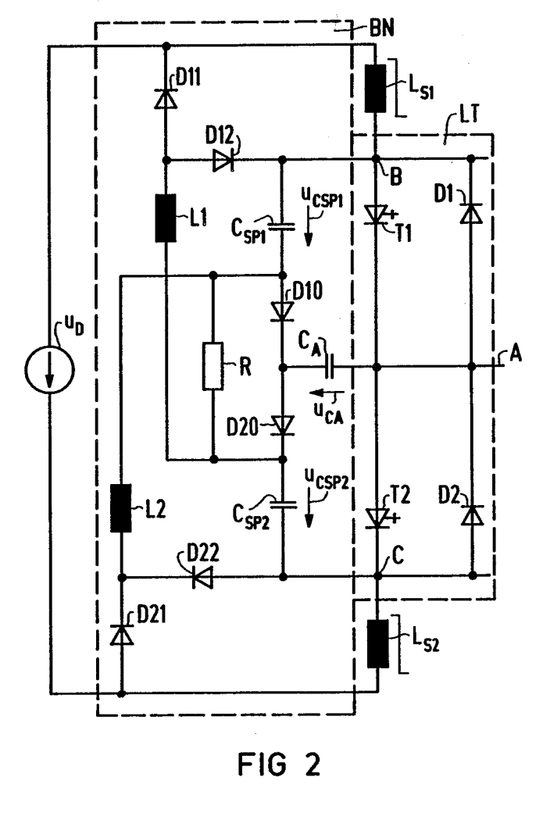
FIG. 2 is a schematic diagram of the wiring network of the present invention.

FIG. 2 is a schematic diagram of the present invention device for performing low-loss relief when the semiconductor switches of an inverter are switched off and on. One phase of the inverter is shown in FIG. 2 as the power section LT, the upper and lower part of which includes the semiconductor switch T1 coupled with the anti-parallel bypass diode D1 and the semiconductor switch T2 coupled with the bypass diode D2, respectively. The output of the phase is designated A and the upper and lower terminals are designated B and C, respectively.

According to the present invention, such a power section LT generally having several phases, is coupled at its upper or lower end B, C, to the positive or negative potential, respectively, of the DC voltage source $u_D$. This coupling occurs via a so-called "step choke" $L_{S1}$ and $L_{S2}$ serving as a saturable inductance. Additionally, each phase of the inverter is provided with a wiring network BN for relieving the semiconductor switching elements T1, T2 to provide low-loss, low-reactive power switching relief during the switching-off and on process. Essentially, a first and second storage capacitor $C_{SP1}$, $C_{SP2}$ and a switching-off relief capacitor $C_A$ provide a switching-off relief effect. First and second switching-on relief choke coils L1, L2 relieve the switching-on effect.

As shown in FIG. 2, the switching-off relief capacitor $C_A$ has one terminal coupled to the output A of the output section LT. The other terminal of capacitor $C_A$ couples to both a first and second series circuit. The first series circuit includes the first storage capacitor $C_{SP1}$ and a first switching-off relief diode D10 and the second series circuit includes the second storage capacitor $C_{SP2}$ and a second switching-off relief diode D20. The first series circuit is coupled at its capacitor $C_{SP1}$ end to the upper end B of the output section LT and at its diode D10 end to the other terminal of the switching-off relief capacitor $C_A$. Similarly, the second series circuit is coupled at its capacitor $C_{SP2}$ end to the lower end C of the output section and at its diode D20 end to the other terminal of the switching-off relief capacitor $C_A$.

The junction point between the first storage capacitor $C_{SP1}$ and the first switching-off relief diode D10 in the first series circuit is furthermore coupled with the lower end C of the output section LT or the negative potential of the DC storage source $u_D$ via the second switching-on relief choke coil L2 and a third or fourth feedback diode D22 or D21, respectively. Finally, the junction point between the second storage capacitor $C_{SP2}$ and the second switching-off relief diode D20 is coupled with the upper end B of the output section LT or the positive potential of the DC voltage source $u_D$ via the first switching-on relief choke coil L1 and a first or second feedback diode D12 or D11, respectively.

A further embodiment of the invention provides an additional discharge resistor R in the external wiring network BN. The discharge resister is coupled between the junction points of the elements in the first and second series circuit. This discharge resister R is shown in the circuit of FIGS. 2 to 4.

The present invention provides a device having no asymmetry internal to the circuit. Rather, the series arrangement of the first storage capacitor $C_{SP1}$ and the switching-off relief capacitor $C_A$, and the series arrangement having the second storage capacitor $C_{SP2}$ and the switching-off relief capacitor $C_A$ provide a switching-off relief effect when the upper or lower semiconductor switch T1 or T2 is switched off. Since the advantageous relationship:

$$C_{SP1} \approx C_{SP2} > > C_A$$

applies for the capacitance values of the capacitors, the recurring positive blocking voltages at the upper or lower semiconductor switches T1, T2 have approximately the same rate of rise.

The stepping choke coils $L_{S1}$, $L_{S2}$ are located between the upper and lower ends B, C of the output section LT and the positive and negative potential of the DC voltage source, respectively. The stepping choke coils function approximately as "time-dependent switches". If such an inductance $L_{S1}$, $L_{S2}$ is subjected to a voltage when in a demagnetized condition, its internal "stepping core" is first magnetized until the saturation state occurs. During the so-called "stepping time" caused thereby, the stepping choke coil has an almost infinite inductance allowing only a very small current to flow. At the end of this stepping time, i.e., after the saturation state of the stepping core is reached, the choke coil almost completely losses its inductance. The stepping choke coil is then quasi "switched on" and current flows at full magnitude due to the remaining parts of the circuit.

In the low loss relief device for the semiconductor switches T1, T2, the saturation property of the stepping choke coils $L_{S1}$, $L_{S2}$ is used, especially when one of the semiconductor switches is switched-on, to temporarily decouple the wiring network BN from the DC voltage source $u_D$. It is therefore possible to feed the overcharge contained in the storage capacitors $C_{SP1}$, $C_{SP2}$, due to a preceding switching-off action of one of the valves, and the magnetizing charge contained in the switching-off relief choke coils L1, L2, into the load output A coupled to the phase inverter's output section LT. The DC voltage source $u_D$ is therefore no longer loaded with pulse-like charge-reversal currents Consequently, because the DC voltage source $u_D$ no longer has to absorb the trapped wire energy stored in the wiring network, it also does not need to make available "reactive commutation power" for maintaining the operability of the switching relief device. Rather, the portion of the DC voltage source energy which must be interim-stored in the wiring network BN for the purpose of switching relief during a switching cycle, is directly passed-on to the supplied load at the end of the cycle nearly without loss.

The operation of the switching relief device of the invention will be further explained with reference to FIGS. 3A to 3D and FIGS. 4A to 4D. FIGS. 3A to 3D illustrate the "current paths" which occur upon switching-off the semiconductor switch T1, while FIGS. 4A to 4D illustrate the "current paths" resulting when the same semiconductor switch T1 is again switched. These "current paths" are explained in greater detail below, with reference to the current and voltage waveforms shown in FIG. 5. The time axis t in FIG. 5 shows the correlation of the Current and voltage waveforms with the circuit states shown in FIGS. 3A to 3D and 4A to 4D.

Figure 3A:
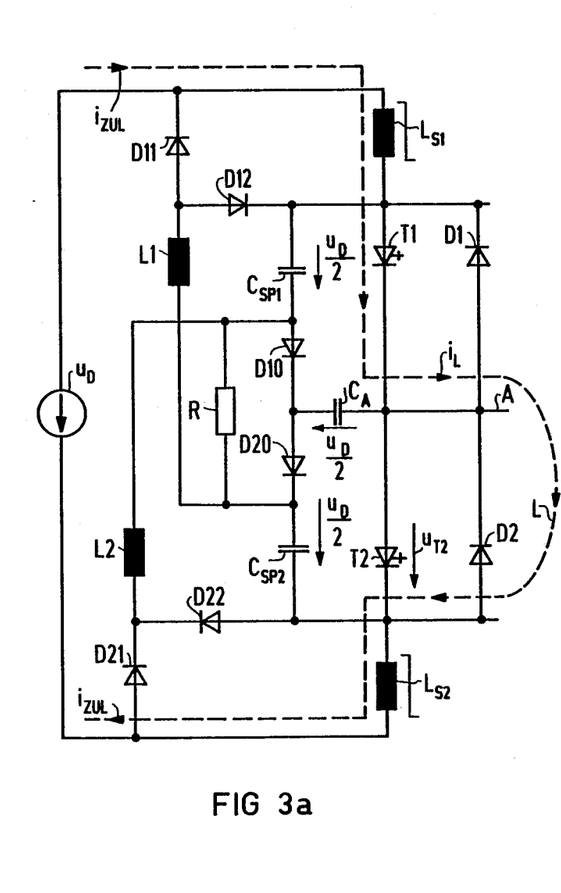
FIGS. 3A–3D are schematic diagrams illustrating by example the operation of the current paths for the wiring network of the present invention when an inverter switch is switched off.

Referring to FIG. 3A, there is shown the steady state of the circuit of FIG. 2 with the upper semiconductor switch T1 switched-on. The load current $i_L$ flows through the circuit with full magnitude to the load L via the first stepping choke coil $L_{S1}$ and the phase output A. From there, the load current $i_L$ flows back into the circuit via the second stepping choke coil $L_{S2}$. The feed current $i_{ZUL}$, in the leads coupling the DC voltage source $u_D$, to the network is equal to the load current $i_L$. In this initial state, the wiring network BN itself carries no current, and the storage capacitors $C_{SP1}$, $C_{SP2}$ and the switching-off relief capacitor $C_A$ are charged to one-half the DC voltage $u_D/2$ with the directions shown in FIG. 3A. In FIG. 5, the corresponding current and voltage waveforms are shown between the points in time $t_0$ and $t_1$.

Figure 3B:
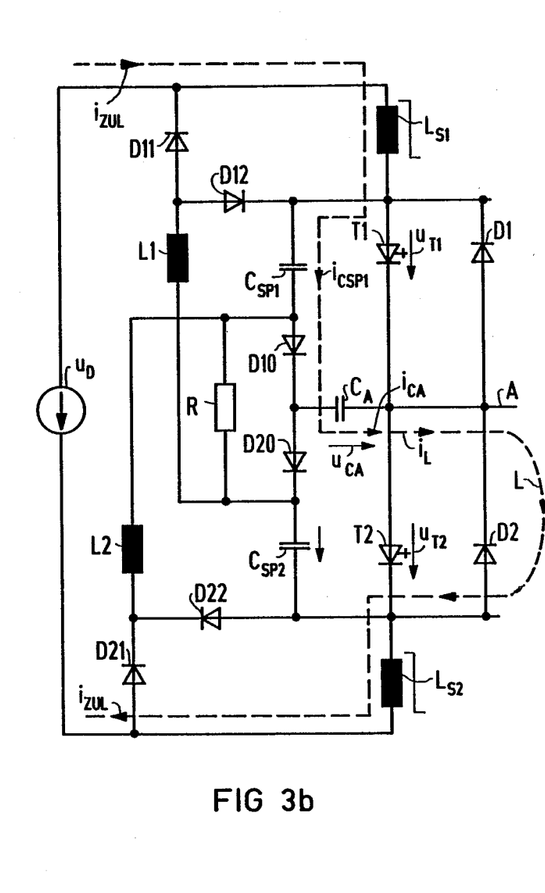

It is assumed that the upper semiconductor switch T1 is switched-off at time $t_1$. Referring now to FIG. 3B, the load current $i_L$ is immediately commutated to the wiring network BN. A current path is developed to the phase output A via the first storage capacitor $C_{SP1}$, the first switching-off relief diode D10 and the switching-off relief capacitor $C_A$. The current relationships are: $i_{ZUL} = i_{CSP1} = i_{CA} = i_L$. Thereby, the switching-off relief capacitor $C_A$ is again recharged to approximately one-half of the DC voltage $u_D$ in the direction of the capacitor voltage $u_{CA}$ shown in FIG. 3B. Due to this recharging, the recurring positive blocking voltage $u_{T1}$, at the semiconductor switch T1 which is just being switched-off, only gradually builds-up in the former direction. The corresponding current and voltage waveforms occurring during this switching-off relief of the semiconductor switch T1 are shown in FIG. 5 between times $t_1$ and $t_2$.

Figure 3C:
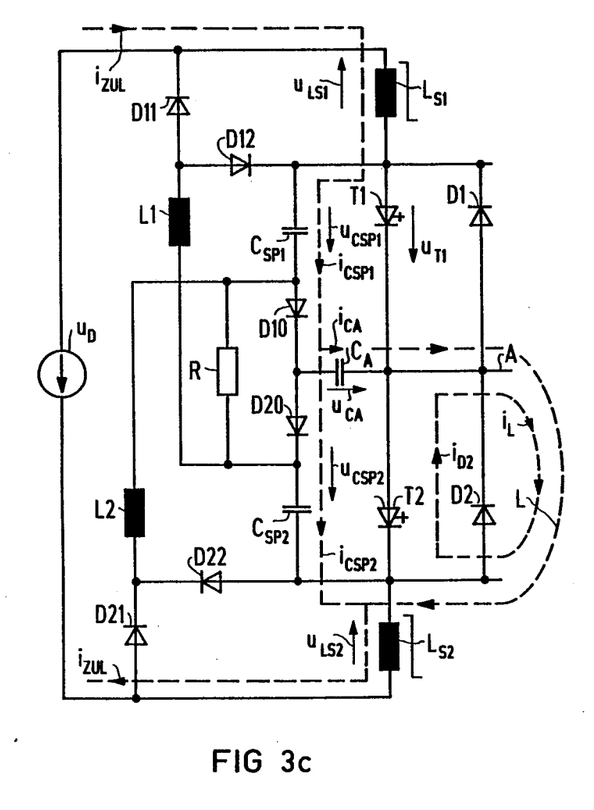

At the instant the voltage $u_{CA}$, at the switching-off relief capacitor, reaches the value of the voltage $u_{CSP2}$, at the second storage capacitor, the second switching-off relief diode D20 begins conducting. This is shown in FIG. 3C and in FIG. 5 between times $t_2$ and $t_3$. The current $i_{CSP1}$ flowing through the first series circuit is now divided into current portion $i_{CA}$ flowing via the switching-off relief capacitor $C_A$ and the load L and into current portion $i_{CSP2}$ flowing via the second series circuit. At the same time, the load current $i_L$ is increasingly commutated to the bypass diode D2. The continued flow of the currents $i_{CSP1}$, $i_{CSP2}$ and $i_{CA}$ leads to a small overcharge, particularly in the two storage capacitors. Since the sum of the corresponding voltages $u_{CSP1}$, and $u_{CSP2}$ is now greater than the value of the DC voltage $u_D$, negative voltages $u_{LS1}$, $u_{LS2}$ appear at the stepping choke coils $L_{S1}$, $L_{S2}$. Therefore, the stepping cores of the stepping choke coils are increasingly demagnetized. This demagnetization causes, for one, the current $i_{ZUL}$ in the leads to decrease and second, to increasingly force the current $i_L$ to flow as a bypass current $i_{D2}$ through the bypass diode D2.

Figure 3D:
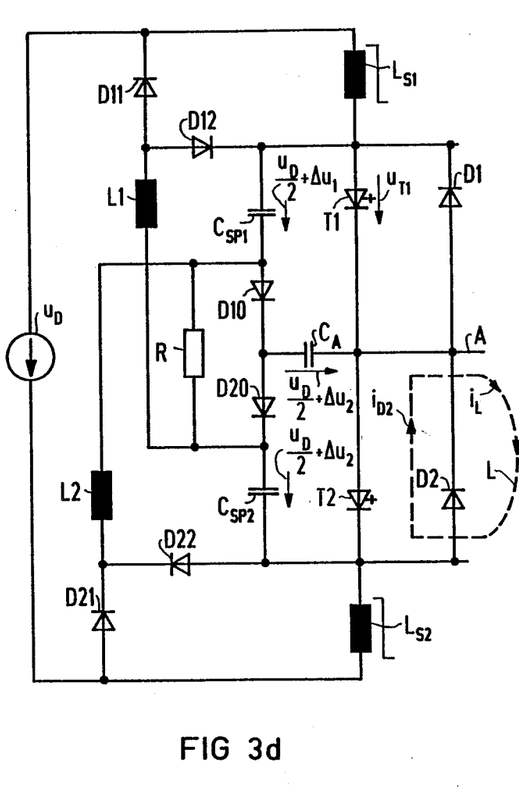

After the stepping choke coils are completely demagnetized, the feed current $i_{ZUL}$ is extinguished. At the same time, the load current $i_L$ flows at full magnitude as the diode current $i_{D2}$ in the bypass via bypass diode D2. This state is shown in FIG. 3D and in FIG. 5 between times $t_3$ and $t_4$. It is further shown in FIG. 5 that all compensation currents in the wiring network and in the stepping choke coils have stopped flowing and all capacitors are now slightly overcharged. It is assumed that the voltage $u_{CSP1}$ at the first storage capacitor $C_{SP1}$ is larger by $\Delta u_1$ than one-half the DC voltage $u_D$. Further, the voltages $u_{CSP1}$ and $u_{CA}$ at the second storage capacitor $C_{SP2}$ and at the switching-off relief capacitor $C_A$ are larger by $\Delta u_2$ than one-half the DC voltage $u_D$.

Figure 4A:
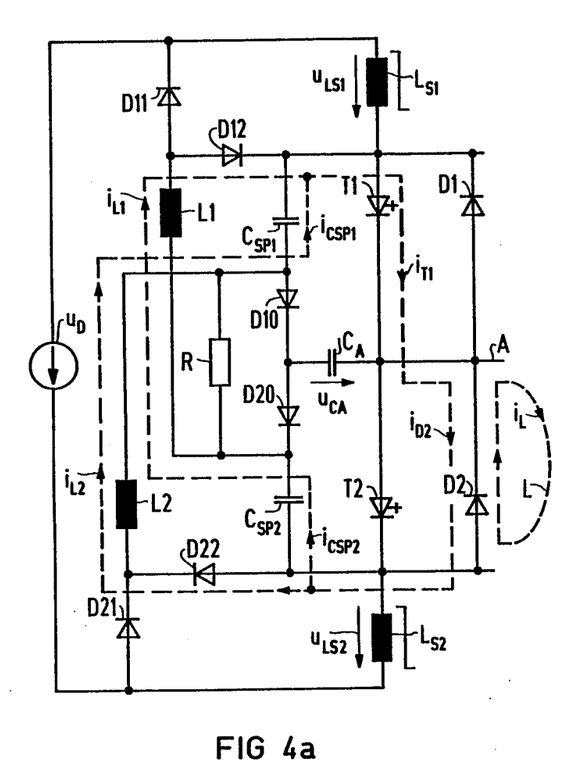
Figure 5:
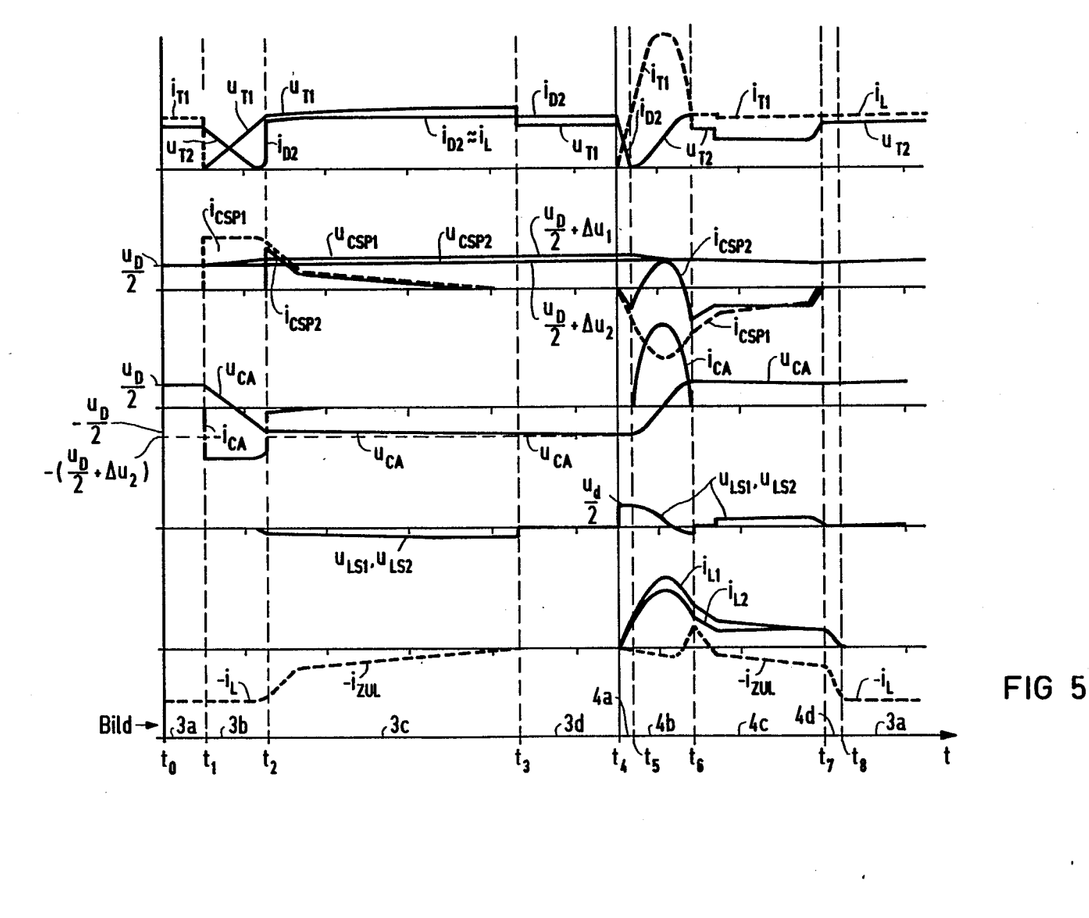
FIG. 5 is a timing diagram for current and voltage waveforms when one of the inverter switches is switched off or on in accordance with FIGS. 3A to 3B and FIGS. 4A to 4D.

Referring now to FIG. 4A, at the time $t_4$, the upper semiconductor switch T1 is again switched-on. The resulting current paths in the circuit at the instant the semiconductor switch T1 is switched-on, are shown in FIGS. 4A and in FIG. 5 between times $t_4$ and $t_5$. The current $i_{T1}$ through semiconductor switch T1 is only gradually built-up due to the action limiting the rise rate of the two switching-on relief choke coils L1 and L2. The current $i_{T1}$ is fed by the currents $i_{L2} = i_{CSP1}$ and $i_{L1} = i_{CSP2}$, respectively. These rising currents are made available by first and second parallel paths coupled in series. The first path includes the second switching-on relief choke coil L2 and the first storage capacitor $C_{SP1}$ and the second path includes the second storage capacitor $C_{SP2}$ and the first switching-on relief choke coil L1. Each path forms a closed resonance circuit via the upper semiconductor switch T1, the phase output A, and the bypass diode D2 which continues to conduct. At this time, the "step time" of the stepping choke coil begins to "run down" in that the feed current $i_{ZUL}$, which increases only gradually (not yet shown in FIG. 4A), magnetizes the stepping choke coils $L_{S1}$, $L_{S2}$. Because the output section LT of the inverter and the wiring network BN are almost completely decoupled from the DC voltage source $u_D$, the two resonant circuit currents $i_{L2}$ and $i_{L2}$ are forced to flow through the upper semiconductor switch T1 in the form of current $i_{T1}$. At the same time, the current $i_{D2}$ continues to decrease and the load current $i_L$ is increasingly forced to flow through the upper semiconductor switch T1 again.

Figure 4B:
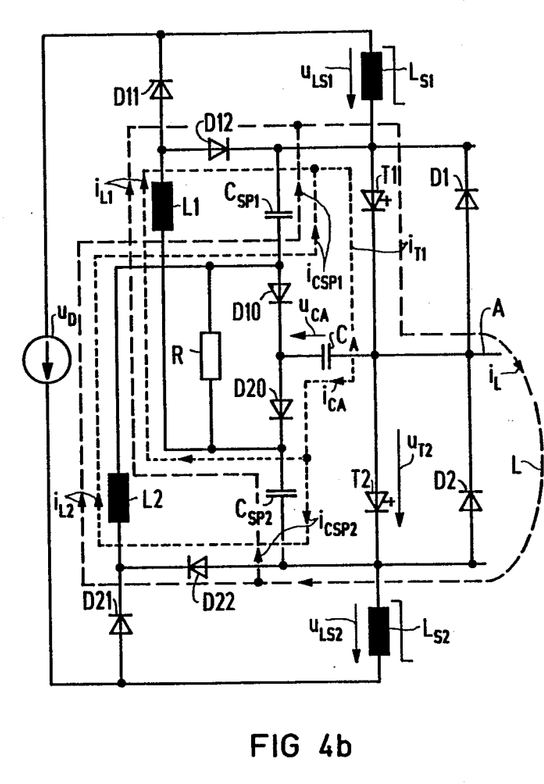

FIG. 4B and FIG. 5, between times $t_5$ and $t_6$, show the state of the inverter after the currents through the bypass diode D2 have been completely extinguished. Because the inverter and the wiring network remain decoupled from the feeding DC voltage source $u_D$ via the stepping choke coils $L_{S1}$, $L_{S2}$, the load current $i_L$ is fed exclusively by the resonant circuit currents $i_{L1}$ and $i_{L2}$. The resonant circuit currents $i_{L1}$ and $i_{L2}$ are superimposed with the charge reversal current $i_{CA}$ which is shown dotted in FIG. 4B. It is a particular advantage of the wiring network that the charge reversal current $i_{CA}$ is conducted via the semiconductor switching element T1 and thus does not load the DC voltage source $u_D$ in any manner. The charge reversal current $i_{CA}$ causes a reverse charging of the switching-off relief capacitor $C_A$ in the direction of the voltage $u_{CA}$ shown in FIG. 4B. This reverse charge is necessary for the switching-off relief capacitor $C_A$ to again have a switching-off relief action once the semiconductor switch T1 is switched off again. At the same time, the original existing overcharge in the switching off relief capacitor $C_A$ is channeled into the load as part of the load current $i_L$ in a particularly advantageous manner. The charge reversal process is complete when the capacitor voltage $u_{CA}$ reaches the value of the voltage $u_{CSP1}$ at the first storage capacitor $C_{SP1}$.

Figure 4C:
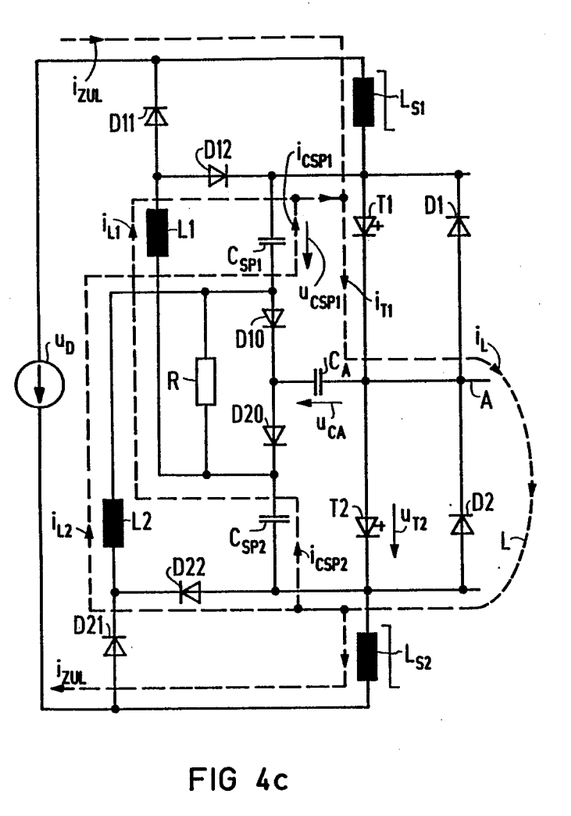

The completed charge reversal state is shown in FIG. 4C and in FIG. 5 between times $t_6$ and $t_7$. Because the load current $i_L$ is fed by the two resonant circuit currents $i_{CSP1}$, $i_{CSP2}$, the trapped energy interim-stored in the storage capacitors is made available to the load. Further, the feed current $i_{ZUL}$ in the leads to the DC voltage source $u_D$, gradually increases due to the increasing magnetization of the stepping choke coils $L_{S1}$ and $L_{S2}$. At the end of the "step time", the stepping choke coils almost completely lose their inductance and are again able to carry the load current $i_L$.

Figure 4D:
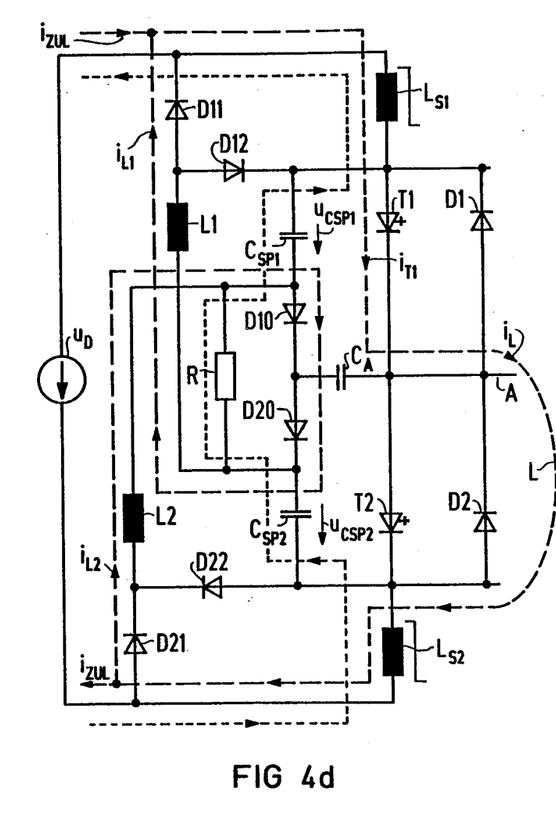

The above described state is shown in FIG. 4D and in FIG. 5 between times $t_7$ and $t_8$. Because the load current $i_L$ is now provided by the stepping choke coils $L_{S1}$, $L_{S2}$, the charge reversal currents $i_{CSP1}$ and $i_{CSP2}$ are extinguished. The voltages $u_{CSP1}$ and $u_{CSP2}$ at the first and second storage capacitors now again reach their approximate starting value $u_D/2$. Because energy is still stored in the switching-on relief choke coils $L_1$ and $L_2$, a current $i_{L1} = i_{L2}$ is formed which flows via the two switching off relief diodes D10 and D20 between the negative and positive potential of the DC voltage source $u_D$. This current temporarily contributes to the feeding of the load current $i_L$. Therefore, the trapped energy stored in the choke coils $L_1$, $L_2$ is also almost completely made available to the load. Only after the discharge current has decayed does the feed current $i_{ZUL}$ again reach the value of the load current $i_L$. All transient currents are terminated and the starting state shown in FIG. 3A is obtained beyond time $t_8$ shown in FIG. 5.

A particular advantage of the switching relief device of the present invention is that it operates nearly without loss if the load current $i_L$ is assumed to be constant. In a further embodiment of the invention, the trapped energy interim-stored in the wiring network BN and the stepping choke coils $L_{S1}$, $L_{S2}$ can be almost completely fed into the load. This occurs particularly if: (1) the step time of the stepping choke coils is longer than the time required for recharging the switching-off relief capacitor during a switching process, especially a switching-on process of one of the semiconductor switches; and (2) the stepping choke coils have a nearly ideal "switching behavior".

However in practice, the load current $i_L$ will not be ideally constant if the load acts in the phase output L with a bucking voltage of its own. For example, if an electric machine serves as the load, the induced voltage which depends on the circular velocity of the motor acts as such a bucking voltage. In that case, the load current generates a harmonic, the frequency of which is substantially determined by the switching-on and off speed of the semiconductor switches in the inverter. Therefore, due to the changing instantaneous value of the load current, the trapped energy can not be completely fed into the load via the slightly asymmetrical resonant circuit currents $i_{L1}$, $i_{L2}$ especially in the circuit state shown in FIG. 4C.

In a further embodiment of the invention, it is particularly advantageous to provide an additional discharge resistor R for compensating the possible existence of slightly different charge states, especially in the storage capacitors $C_{SP1}$, $C_{SP2}$. The use of discharge resistor R is shown in the circuits of FIGS. 2 to 4. The discharge resistor R is coupled to the junction points between the first storage capacitor $C_{SP1}$ and the first switching-off relief diode D10 and the second storage capacitor $C_{SP2}$ and the second switching-off relief diode D20. Therefore, a small compensation current, shown in FIG. 4D by dotted lines, forms from the negative to the positive potential of the DC voltage source $u_D$ via the second stepping choke coil $L_{S2}$, the second storage capacitor $C_{SP2}$, the discharge resistor R, the first storage capacitor $C_{SP1}$ and the first stepping choke coil $L_{S1}$. In this manner, the starting state of the circuit shown in FIG. 3A, in which all wiring capacitors are charged to one-half of the DC voltage $u_D$, is again reached even in the case of a harmonic-containing load current and non-ideal "switching behavior" of the stepping choke coils.

What is claimed is:

1. A circuit providing low-loss relief for an inverter during a switching-off and on process of a plurality of semiconductor switches, said inverter having a phase output and being coupled to a DC voltage source, the circuit comprising:

a first saturable inductance coupled between a positive potential of said voltage source and an upper end of said inverter;

a second saturable inductance coupled between a lower end of said inverter and a negative potential of said voltage source;

a wiring network coupled to said inverter and wherein said wiring network further comprises:

(a) a first capacitor, having a first and a second terminal, coupled at said first terminal to said phase output;

(b) a first series circuit including a first storage capacitor and a first diode, said series circuit coupled at the first storage capacitor end to said upper end of said inverter and at the first diode end to said second terminal of said first capacitor;

(c) a second series circuit including a second storage capacitor and a second diode, said second series circuit coupled at the second storage capacitor end to said lower end of said inverter and at the second diode end to said second terminal of said first capacitor;

(d) a first relief coil coupled at one end to a first junction point in said second series circuit between said second storage capacitor and said second diode;

(e) a first feedback diode coupled between said first relief coil and said positive potential;

(f) a second feedback diode coupled between said first relief coil and said upper end of said inverter;

(g) a second relief coil coupled at one end to a second junction point in said first series circuit between said first storage capacitor and said first diode;

(h) a third feedback diode coupled between said second relief coil and said negative potential; and (i) a fourth feedback diode coupled between said second relief coil and said lower end of said inverter.

2. A circuit according to claim 1, further comprising a resistor coupled between said first and second junction points.

3. A circuit according to claim 1 wherein said first and second saturable inductances have a stepping time greater than a charge reversal time for said first capacitor during a switching process.

4. A circuit according to claim 3 wherein said stepping time is greater than said charge reversal time for a switching-on process of one of said plurality of semiconductor switches.

5. A circuit according to claim wherein said inverter is a multiphase inverter having multiple phase outputs.

6. A circuit according to claim 5 wherein said wiring network is coupled to each phase of said multiple phase inverter.

7. A circuit according to claim 6 further comprising a resistor coupled between said first and second junction points.

8. A circuit according to claim 6 wherein said first and second saturable inductances have a stepping time greater than a charge reversal time for said first capacitor during a switching process.

9. A circuit according to claim 8 wherein said stepping time is greater than said charge reversal time for a switching-on process of one of said plurality of semiconductor switches.

* * * * *